United States Patent
Helvick

(10) Patent No.: US 8,681,710 B2
(45) Date of Patent: Mar. 25, 2014

(54) METHOD AND SYSTEM FOR DELIVERING MULTICAST/BROADCAST SERVICES IN A HALF FREQUENCY DIVISION DUPLEX WIRELESS COMMUNICATION SYSTEM

(75) Inventor: Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1366 days.

(21) Appl. No.: 12/082,743

(22) Filed: Apr. 14, 2008

(65) Prior Publication Data

US 2009/0258653 A1    Oct. 15, 2009

(51) Int. Cl.
*H04W 4/00*    (2009.01)

(52) U.S. Cl.
USPC ............ 370/329; 370/330; 370/331; 370/328

(58) Field of Classification Search
USPC ......................................................... 370/329
See application file for complete search history.

(56) References Cited

U.S. PATENT DOCUMENTS

| | | | |
|---|---|---|---|
| 7,209,455 B2 | 4/2007 | Yee et al. | 370/310.1 |
| 2005/0174971 A1 | 8/2005 | Lenzini et al. | 370/336 |
| 2007/0133498 A1 | 6/2007 | Nascimbene et al. | 370/345 |
| 2008/0009319 A1 | 1/2008 | Kim et al. | 455/560 |

*Primary Examiner* — Shripal Khajuria
(74) *Attorney, Agent, or Firm* — Scot A. Reader

(57) ABSTRACT

A method and system for delivering MBS in an H-FDD wireless communication system minimizes MBS bandwidth allocation and maintains appropriate balance between two H-FDD mobile device groups. Generally speaking, this is achieved by allocating a downlink bandwidth section for one group of mobile devices (e.g. Group 2) to MBS and allowing a subgroup of mobile devices (e.g. Group 1A) in the other group (e.g. Group 1) that subscribes to MBS to participate in the former group (e.g. Group 2) as required to identify and decode MBS data.

10 Claims, 5 Drawing Sheets

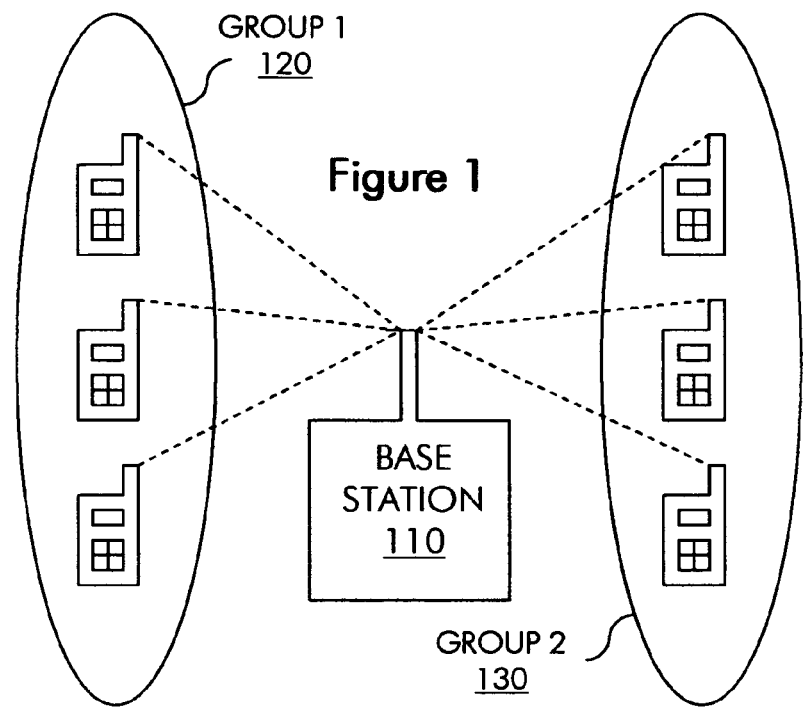
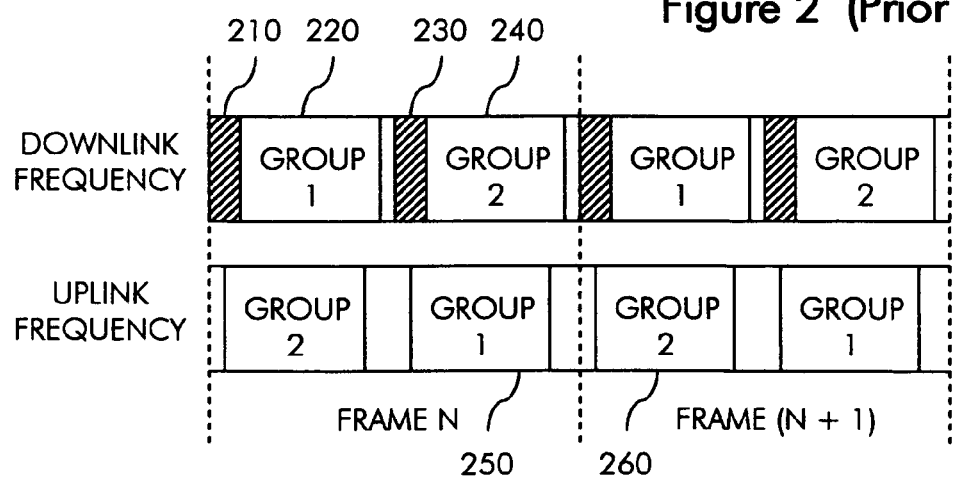

METHOD AND SYSTEM FOR DELIVERING MULTICAST/BROADCAST SERVICES IN A HALF FREQUENCY DIVISION DUPLEX WIRELESS COMMUNICATION SYSTEM

BACKGROUND OF THE INVENTION

The present invention relates to delivering multicast/broadcast services (MBS) in a half frequency division duplex (H-FDD) wireless communication system and, more particularly, to delivering MBS over H-FDD in a way that minimizes MBS bandwidth allocation and maintains appropriate balance between two H-FDD mobile device groups.

Institute of Electrical and Electronics Engineers Standard 802.16 (IEEE 802.16) for wireless metropolitan area networks, commonly known as WiMAX (an acronym for Worldwide Interoperability for Microwave Access), was originally designed for time division duplex operation in which a single frequency is used for both transmission and reception. However, much of the wireless spectrum made available for WiMAX by governments has paired frequencies for use in a frequency division duplex (FDD) operation wherein one frequency is used for transmission while the other is used for reception. Thus, WiMAX is being adapted to support FDD.

Unfortunately, deployment of WiMAX systems with full support for FDD may often be cost prohibitive since the mobile devices in such systems must be able to transmit and receive simultaneously. To reduce the cost of deployment of WiMAX systems on paired frequencies, many mobile devices will instead support H-FDD. Referring to FIG. 1, an exemplary H-FDD system is shown. The mobile devices are divided into two groups: Group 1 120 and Group 2 130. A base station 110 simultaneously transmits data to one or more mobile devices in one group on a downlink frequency while receiving data from a mobile device in the other group on an uplink frequency. The mobile devices do not simultaneously transmit and receive data. Instead, the mobile devices switch between the downlink frequency and the uplink frequency to receive and transmit data in sequence. Mobile devices in Group 1 120 transmit data to base station 110 on an uplink frequency while mobile devices in Group 2 receive data from base station 110 on a downlink frequency, and vice versa.

These operations are shown in greater detail in FIG. 2. The H-FDD system includes a downlink frequency on which mobile devices receive data from base station 110 and an uplink frequency on which mobile devices transmit data to base station 110. Base station 110 transmits on the downlink frequency a Group 1 allocation map 210 that allocates sections of Group 1 downlink bandwidth 220 and Group 1 uplink bandwidth 250 to individual mobile devices in Group 1 120. Base station 110 also transmits on the downlink frequency a Group 2 allocation map 230 that allocates sections of Group 2 downlink bandwidth 240 and Group 2 uplink bandwidth 260 to individual mobile devices in Group 2 130. Mobile devices in Group 1 120 decode Group 1 allocation map 210 to determine their respectively allocated sections of Group 1 downlink bandwidth 220 and uplink bandwidth 250. Similarly, mobile devices in Group 2 130 decode Group 2 allocation map 230 to determine their respectively allocated sections of Group 2 downlink bandwidth 240 and uplink bandwidth 260. The mobile devices proceed to decode data transmitted by base station 110 during their respectively allocated sections of downlink bandwidth and transmit data to base station 110 during their respectively allocated sections of uplink bandwidth.

One unresolved issue surrounding use of H-FDD with WiMAX is how to best deliver MBS. MBS are streaming services defined in WiMAX over which a base station can deliver multimedia broadcasts and multicasts (e.g. television station feeds) simultaneously to many mobile devices. One approach to delivering MBS over H-FDD that has been suggested is to force all mobile devices that subscribe to MBS into a single group. This approach is illustrated in FIG. 3. All mobile devices subscribing to MBS are placed in Group 2. Base station 110 transmits on the downlink frequency a Group 2 allocation map 310 that allocates a Group 2 downlink bandwidth section 320 to MBS. Mobile devices in Group 2 that subscribe to MBS decode Group 2 allocation map 310 and identify section 320 as allocated to MBS, and also identify their respectively allocated individual sections of Group 2 downlink bandwidth and uplink bandwidth. These mobile devices in Group 2 proceed to decode MBS data transmitted by base station 110 during section 320, and also decode data transmitted by base station 110 during their respectively allocated individual sections of downlink bandwidth and transmit data to base station 110 during their respectively allocated individual sections of uplink bandwidth. While this approach only requires allocation of MBS bandwidth to a single group, a high rate of subscription to MBS can create a lack of group balance. In the example shown, if most of the mobile devices in the H-FDD system subscribe to MBS, Group 2 will be disproportionately large relative to Group 1. Compounding the problem, less downlink bandwidth will be available for individual allocation to members of Group 2 than members of Group 1. This can severely complicate allocation of bandwidth by the base station scheduler.

Another approach to delivering MBS over H-FDD that has been suggested is to allocate downlink bandwidth sections to MBS within both Group 1 and Group 2. This approach is illustrated in FIG. 4. Mobile devices subscribing to MBS are divided between Group 1 120 and Group 2 130. Base station 110 transmits on the downlink frequency a Group 1 allocation map 410 that allocates a Group 1 downlink bandwidth section 420 to MBS. Mobile devices in Group 1 that subscribe to MBS decode Group 1 allocation map 410 and identify section 420 as having been allocated to MBS, and also identify their respectively allocated individual sections of Group 1 downlink bandwidth and uplink bandwidth. Mobile devices in Group 1 then decode MBS data transmitted by base station 110 during section 420, and also decode data transmitted by base station 110 during their respectively allocated individual sections of downlink bandwidth and transmit data to base station 110 during their respectively allocated individual sections of uplink bandwidth. Similarly, base station 110 transmits on the downlink frequency a Group 2 allocation map 430 that allocates a Group 2 downlink bandwidth section 440 to MBS. Mobile devices in Group 2 that subscribe to MBS decode Group 2 allocation map 430 and identify section 440 as having been allocated to MBS, and also identify their respectively allocated individual sections of Group 2 downlink bandwidth and uplink bandwidth. Mobile devices in Group 2 then decode MBS data transmitted by base station 110 during section 440, and also decode data transmitted by base station 110 during their respectively allocated individual sections of downlink bandwidth and transmit data to base station 110 during their respectively allocated individual sections of uplink bandwidth. This approach allows group balance to be maintained; however, it doubles the bandwidth allocation to MBS. This reduces the amount of downlink bandwidth available for individual allocation and can delay important transmissions.

SUMMARY OF THE INVENTION

The present invention, in a basic feature, provides a method and system for delivering MBS in an H-FDD wireless communication system and, more particularly, to delivering MBS over H-FDD in a way that minimizes MBS bandwidth allocation and maintains appropriate balance between two H-FDD mobile device groups. Generally speaking, this is achieved by allocating a downlink bandwidth section for one group of mobile devices (e.g. Group 2) to MBS and allowing a subgroup of mobile devices (e.g. Group 1A) in the other group (e.g. Group 1) that subscribes to MBS to participate in the former group (e.g. Group 2) as required to identify and decode MBS data.

In one aspect of the invention, a mobile device comprises a wireless network interface and a processor communicatively coupled with the wireless interface, wherein under control of the processor the mobile device determines from a first allocation map for a first device group received via the wireless interface one or more sections of downlink bandwidth and one or more sections of uplink bandwidth allocated to the mobile device, determines from a second allocation map for a second device group received via the wireless interface one or more sections of downlink bandwidth allocated to MBS, decodes data received via the wireless interface during the sections of downlink bandwidth allocated to the mobile device and the sections of downlink bandwidth allocated to MBS and transmits data via the wireless interface during the sections of uplink bandwidth allocated to the mobile device.

In some embodiments, the mobile device first determines the one or more sections of downlink bandwidth and one or more sections of uplink bandwidth allocated to the mobile device, then decodes data during the sections of downlink bandwidth allocated to the mobile device, then determines the sections of downlink bandwidth allocated to MBS, then decodes the sections of downlink bandwidth allocated to MBS and finally transmits data during the sections of uplink bandwidth allocated to the mobile device.

In some embodiments, under control of the processor the mobile device switches the wireless interface from a downlink frequency to an uplink frequency after decoding the sections of downlink bandwidth allocated to MBS and before transmitting the data during the sections of uplink bandwidth allocated to the mobile device.

In some embodiments, under control of the processor the mobile device switches the wireless interface from the uplink frequency to the downlink frequency after transmitting the data during the sections of uplink bandwidth allocated to the mobile device.

In some embodiments, the sections of downlink bandwidth allocated to MBS immediately follow the second allocation map on a downlink frequency.

In some embodiments, the data transmitted during the sections of uplink bandwidth allocated to the mobile device include an indication that the mobile device is a member of the first device group and is subscribing to MBS.

In some embodiments, the data transmitted during the sections of uplink bandwidth allocated to the mobile device include a request to join the second device group.

In some embodiments, the request is prompted by a determination on the mobile device that a need for uplink bandwidth exceeds a predetermined threshold.

In another aspect of the invention, a base station comprises a wireless network interface and a processor communicatively coupled with the wireless network interface, wherein under control of the processor the base station assigns a plurality of mobile devices that communicate with the base station via the wireless interface to device groups, wherein the device groups comprise a first device group and a second device group, wherein the first device group comprises a first subgroup that subscribes to MBS and a second subgroup that does not subscribe to MBS, and wherein the first subgroup participates in the second device group as required to identify and decode MBS data.

In some embodiments, the first subgroup has at least a first mobile device, and under control of the processor the base station transmits via the wireless interface a first allocation map for the first device group from which the first mobile device determines one or more sections of downlink bandwidth and one or more sections of uplink bandwidth allocated to the first mobile device, transmits via the wireless interface a second allocation map for the second device group from which the first mobile device determines one or more sections of downlink bandwidth allocated to MBS, transmits via the wireless interface during the sections of downlink bandwidth allocated to the first mobile device and the sections of downlink bandwidth allocated to MBS data that is decoded by the first mobile device, and decodes data from the first mobile device received via the wireless interface during the sections of uplink bandwidth allocated to the first mobile device.

In some embodiments, the decoded data from the first mobile device comprises an indication that the first mobile device belongs to the first subgroup.

In some embodiments, the base station reassigns the first mobile device to the second device group based at least in part on a determination of insufficient uplink bandwidth for the first subgroup.

In some embodiments, the decoded data from the first mobile device comprises a request for reassignment to the second device group.

In some embodiments, the first device group comprises a second subgroup having at least a second mobile device that determines from the first allocation map one or more sections of downlink bandwidth and one or more sections of uplink bandwidth allocated to the second mobile device, decodes data transmitted via the wireless interface during the sections of downlink bandwidth allocated to the second mobile device and transmits data received via the wireless interface during the sections of uplink bandwidth allocated to the second mobile device.

In some embodiments, the second device group has at least a third mobile device that determines from the second allocation map one or more sections of downlink bandwidth and one or more sections of uplink bandwidth allocated to the third mobile device, decodes data transmitted via the wireless interface during the sections of downlink bandwidth allocated to the third mobile device and transmits data received via the wireless interface during the sections of uplink bandwidth allocated to the third mobile device.

In yet another aspect of the invention, a method for receiving MBS over H-FDD comprises the steps of determining by a mobile device from a first allocation map for a first device group one or more sections of downlink bandwidth and one or more sections of uplink bandwidth allocated to the mobile device, determining by the mobile device from a second allocation map for a second device group one or more sections of downlink bandwidth allocated to MBS, decoding by the mobile device data received during the sections of downlink bandwidth allocated to the mobile device and the sections of downlink bandwidth allocated to MBS and transmitting by the mobile device data during the sections of uplink bandwidth allocated to the mobile device.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 1 shows an H-FDD system.

FIG. 2 shows a known H-FDD system timing diagram.

DETAILED DESCRIPTION OF A PREFERRED EMBODIMENT

Figure 3:
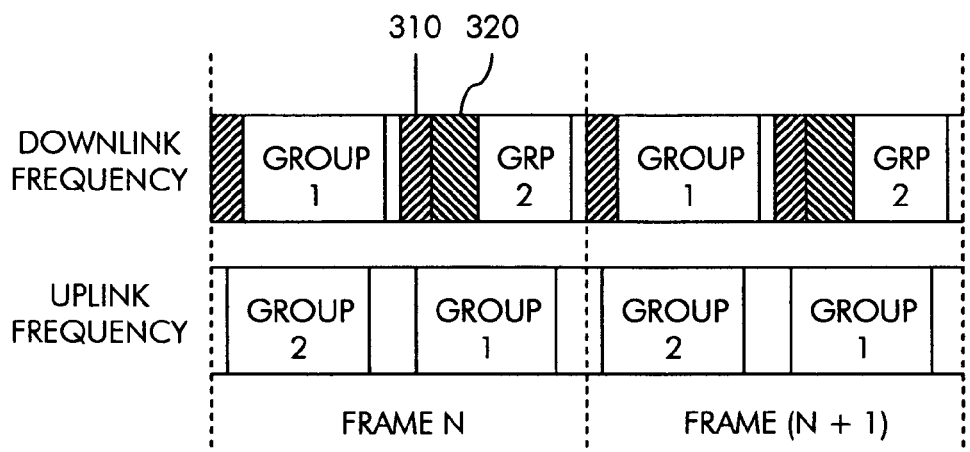
FIG. 3 shows a known H-FDD system timing diagram for delivering MBS over H-FDD.
Figure 4:
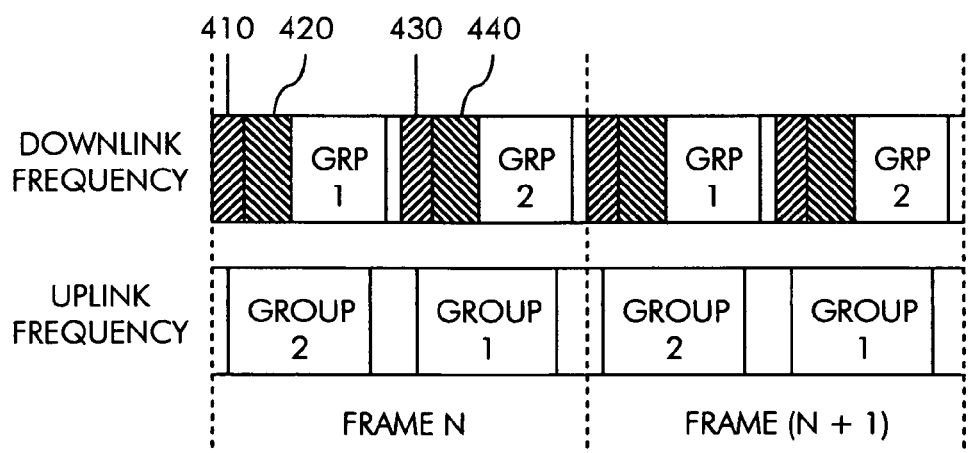
FIG. 4 shows another known H-FDD system timing diagram for delivering MBS over H-FDD.
Figure 5:
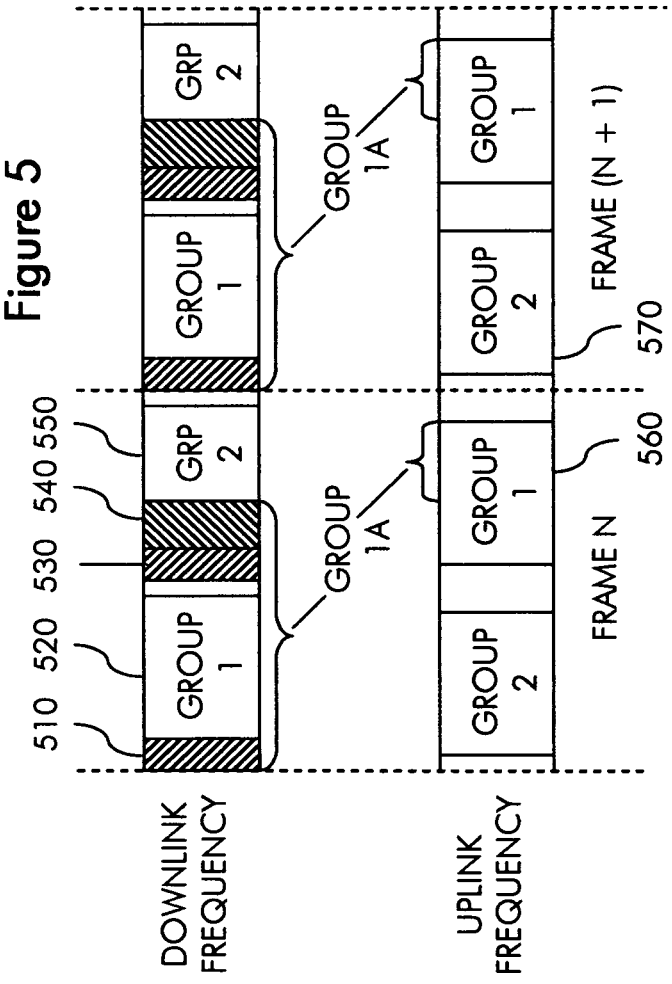
FIG. 5 shows an H-FDD system timing diagram for delivering MBS over H-FDD in some embodiments of the invention.

FIG. 5 shows an H-FDD system timing diagram for delivering MBS over H-FDD in some embodiments of the invention. The system delivers MBS over H-FDD in a way that minimizes MBS bandwidth allocation and maintains appropriate balance between two H-FDD mobile device groups. Mobile devices that subscribe to MBS are divided between Group 1 120 and Group 2 130. Bandwidth is allocated to MBS within Group 2 downlink bandwidth 550; however, no bandwidth is allocated to MBS within Group 1 downlink bandwidth 520. Instead, mobile devices in Group 1 120 that subscribe to MBS are allowed to participate in Group 2 130 as required to identify and decode MBS data. This MBS subgroup of Group 1 mobile devices is referred to herein as "Group 1A".

Continuing with FIG. 5, the H-FDD system includes a downlink frequency on which mobile devices receive data from base station 110 and an uplink frequency on which mobile devices transmit data to base station 110. Base station 110 transmits on the downlink frequency a Group 1 allocation map 510 that allocates sections of Group 1 downlink bandwidth 520 and Group 1 uplink bandwidth 560 to individual mobile devices in Group 1 120. Base station 110 also transmits on the downlink frequency a Group 2 allocation map 530 that allocates sections of Group 2 downlink bandwidth 550 and Group 2 uplink bandwidth 570 to individual mobile devices in Group 2 130 and additionally allocates a Group 2 downlink bandwidth section 540 to MBS.

Mobile devices that are in Group 1 120 but are not in Group 1A (i.e. Group 1 devices that do not subscribe to MBS) decode Group 1 allocation map 510 to determine their respectively allocated sections of Group 1 downlink bandwidth 520 and uplink bandwidth 560. These Group 1 devices proceed to decode data transmitted by base station 110 during their respectively allocated sections of Group 1 downlink bandwidth 520, then switch from the downlink frequency to the uplink frequency, and then transmit data to base station 110 during their respectively allocated sections of Group 1 uplink bandwidth 560 before returning to the downlink frequency for the next frame.

Mobile devices in Group 1A similarly decode Group 1 allocation map 510 to determine their respectively allocated sections of Group 1 downlink bandwidth 520 and uplink bandwidth 560. Group 1A devices proceed to decode data transmitted by base station 110 during their respectively allocated sections of Group 1 downlink bandwidth 520. However, before switching from the downlink frequency to the uplink frequency, Group 1A devices decode Group 2 allocation map 530 to determine the sections of Group 2 downlink bandwidth 550 allocated to MBS, namely section 540, and decode the MBS data transmitted by base station 110 during section 540. Only then do Group 1A devices switch from the downlink frequency to the uplink frequency and transmit data to base station 110 during their respectively allocated sections of Group 1 uplink bandwidth 560 before returning to the downlink frequency for the next frame. In some embodiments, section 540 allocated to MBS immediately follows Group 2 allocation map 530 on the downlink frequency to enable Group 1A devices to decode MBS data and switch to the uplink frequency at the earliest possible time.

Mobile devices in Group 2 130 that subscribe to MBS decode Group 2 allocation map 530 to determine the sections of Group 2 downlink bandwidth 550 allocated to MBS, namely section 540, as well as their respectively allocated sections of Group 2 downlink bandwidth 550 and uplink bandwidth 570. Group 2 devices proceed to decode the MBS data transmitted by base station 110 during section 540, then decode data transmitted by base station 110 during their respectively allocated sections of Group 2 downlink bandwidth 550, then switch from the downlink frequency to the uplink frequency, and then transmit data to base station 110 during their respectively allocated sections of Group 2 uplink bandwidth 570 before returning to the downlink frequency. Mobile devices in Group 2 that do not subscribe to MBS operate similarly except do not determine the sections of Group 2 downlink bandwidth 550 allocated to MBS or decode MBS data transmitted by base station 110 during such sections.

Not every mobile device will be allocated sections of downlink bandwidth and uplink bandwidth in every frame. For example, a Group 1A mobile device that is being used to watch a video broadcast may decode MBS data transmitted by base station 110 during the Group 2 downlink bandwidth section allocated to MBS (i.e. section 540) without decoding data transmitted by base station 110 during any section of Group 1 downlink bandwidth 520 or transmitting data to base station 110 during any section of Group 1 uplink bandwidth 560.

Figure 6:
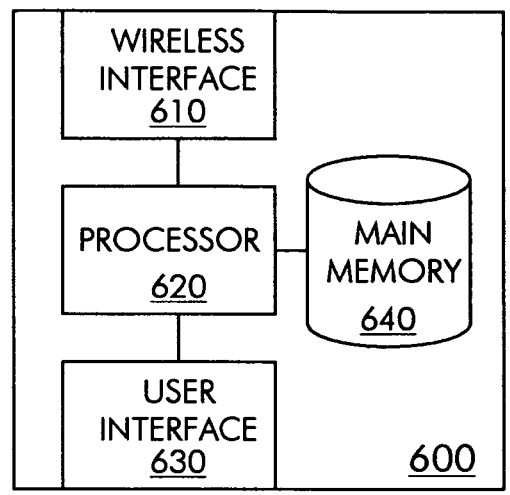
FIG. 6 shows a mobile device operative within an H-FDD system in some embodiments of the invention.

FIG. 6 shows a mobile device 600 in some embodiments of the invention. Device 600 may be, for example, a cellular phone, personal data assistant (PDA) or notebook computer that is WiMAX compliant. Device 600 has a wireless network interface 610, a user interface 630 and a main memory 640, all of which are communicatively coupled with a processor 620. Wireless interface 610 transmits and receives data using H-FDD on paired frequencies over wireless communication links established with base stations. User interface 630 receives inputs from a human user of device 600 via one or more input devices and displays outputs to the user via one or more output devices. Input devices include, for example, a finger or stylus-operated touch screen, a scroll wheel or ball, a keypad and/or voice command module, for initiating requests and navigating and manipulating output rendered on a display. Output devices include a display, such as a liquid crystal display (LCD), light emitting diode (LED) display, for displaying output. Processor 620 executes in software operations supported by device 600, including management of WiMAX compliant wireless links established with base stations via wireless interface 610, requesting assignment or reassignment to a device group (e.g. Group 1, Group 2) and bandwidth allocations at appropriate times, decoding data received on the downlink frequency at appropriate times, transmitting data on the uplink frequency at appropriate times, switching between the uplink and downlink frequency at appropriate times, rendering on user interface 630 data received on the downlink frequency, and servicing requests initiated on user interface 630. Data rendered on the one or more output devices of user interface 630 under control of processor 620 includes WiMAX MBS content received via wireless interface 610 and decoded under control of processor 620. Main memory 640 stores software executable by processor 620. Main memory 640 includes one or more random access memories (RAM) and one or more read only memories (ROM).

Figure 7:
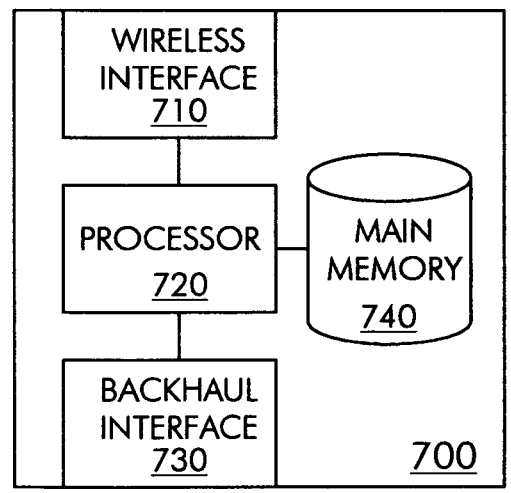
FIG. 7 shows a base station operative within an H-FDD system in some embodiments of the invention.

FIG. 7 shows a base station 700 in some embodiments of the invention. Base station 700 may be, for example, a tower mounted to the ground that is WiMAX compliant. Base station 700 has a wireless network interface 710, a backhaul interface 730 and a main memory 740 communicatively coupled with a processor 720. Wireless interface 710 simultaneously transmits and receives data on paired frequencies over wireless communication links established with mobile devices that are operating in H-FDD. Backhaul interface 730 is a wired or wireless network interface that connects to the Internet or another WiMAX base station. Processor 720 executes in software and/or custom circuitry operations supported by base station 700, including management of WiMAX compliant wireless links established with mobile devices via wireless interface 710, assigning and reassigning mobile devices to device groups (Group 1, Group 2) at appropriate times, generating allocations maps for device groups (Group 1, Group 2) based on bandwidth allocation requests received from mobile devices, transmitting to mobile devices on the downlink frequency at appropriate times data originated on base station 700 and data received via backhaul interface 730 (e.g. WiMAX MBS content), decoding data received from mobile devices on the uplink frequency, transmitting via backhaul interface 730 data originated on base station 700 and data received from mobile devices on the uplink frequency and servicing requests received from mobile devices on the uplink frequency. Main memory 740 stores software executable by processor 720. Main memory 740 includes RAM and ROM.

In order for the H-FDD system operating according to the timing diagram shown in FIG. 5 to function optimally, base station 700 must allocate to Group 1A devices sections of the Group 1 uplink bandwidth 560 that occur after section 540. In some embodiments, mobile devices in Group 1 that subscribe to MBS notify station 700 that they are Group 1A devices to enable station 700 to allocate to these devices sections of the Group 1 uplink bandwidth 560 that occur after section 540. In these embodiments, if there is insufficient Group 1 uplink bandwidth 560 after section 540 to allocate to Group 1A devices, then base station 700 under control of processor 720 reassigns some Group 1A devices to Group 2 and notifies the affected devices of reassignment. In other embodiments, base station 700, under control of processor 720, packs allocations of Group 1 uplink bandwidth 560 such that Group 1 devices that request smaller allocations are allocated later sections and Group 1 devices that request larger allocations are allocated earlier sections. In these embodiments, mobile devices in Group 1 that are acting as Group 1A devices request reassignment to Group 2 upon determining that their need for uplink bandwidth exceeds a predetermined threshold. In still other embodiments, mobile devices request assignment or reassignment to a particular device group based on multiple quality of service (QoS) parameters such as uplink bandwidth requirements and latency tolerance, as well as whether the mobile device subscribes to MBS.

Figure 8:
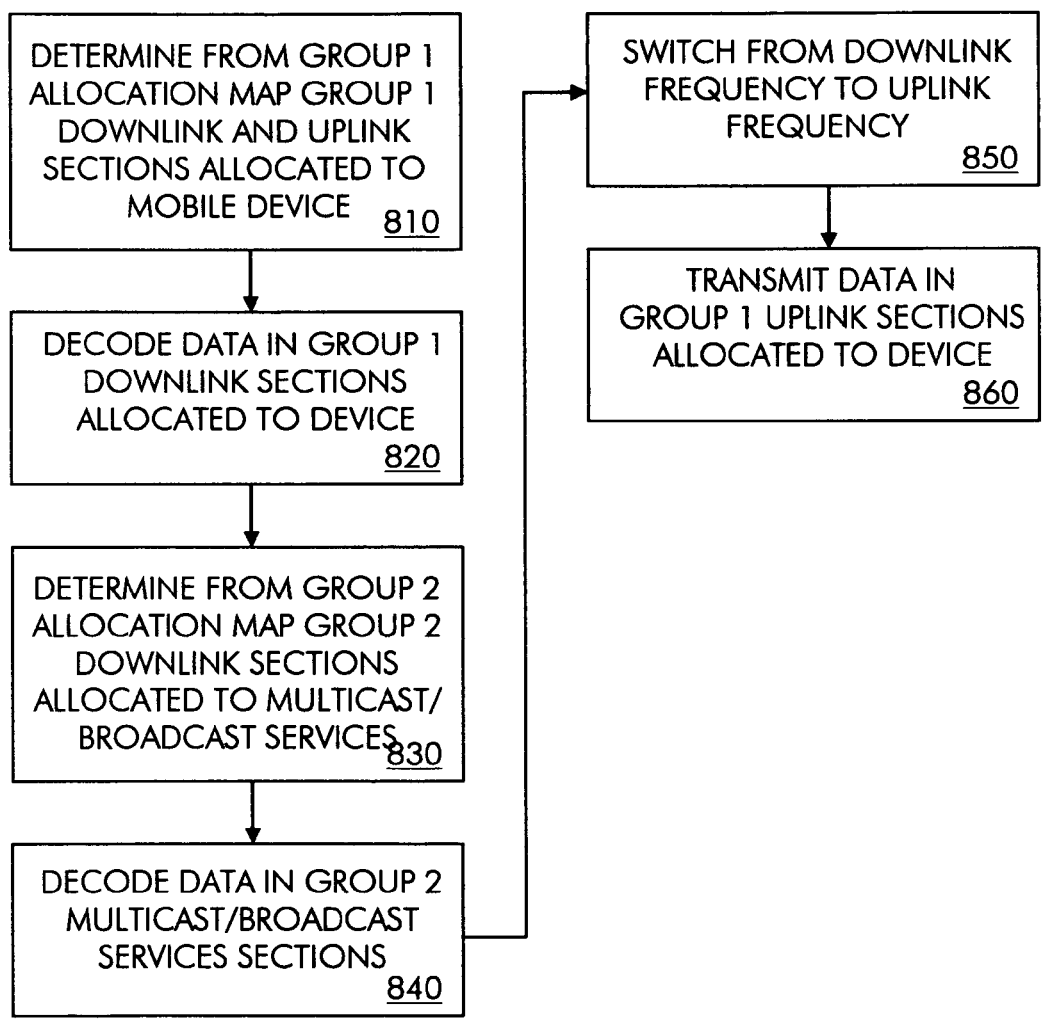
FIG. 8 shows a method for delivering MBS over H-FDD in some embodiments of the invention.

FIG. 8 shows a method for delivering MBS over H-FDD in some embodiments of the invention. The method steps are performed by a Group 1A mobile device in the context of the timing diagram shown in FIG. 5. The mobile device determines from the Group 1 allocation map 510 sections of Group 1 downlink bandwidth 520 and Group 1 uplink bandwidth 560 allocated to the mobile device (810). Next, the mobile device decodes data in the sections of Group 1 downlink bandwidth 520 allocated to the mobile device (820). Next, the mobile device determines from the Group 2 allocation map 530 sections of Group 2 downlink bandwidth 550 allocated to MBS, namely section 540 (830). Next, the mobile device decodes MBS data in section 540 (840). Next, the mobile device switches from the downlink frequency to the uplink frequency (850). Finally, the mobile device transmits data in the sections of Group 1 uplink bandwidth 560 allocated to the mobile device (860).

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. In a half frequency division duplex (H-FDD) communication system having one or more first mobile devices in a first device group and one or more second mobile devices in a second device group, wherein each first mobile device is configured to determine from a first allocation map received via a first wireless interface one or more sections of downlink bandwidth and one or more sections of uplink bandwidth allocated to the first mobile device, decode data received via the first wireless interface during the sections of downlink bandwidth allocated to the first mobile device and transmit data via the first wireless interface during the sections of uplink bandwidth allocated to the first mobile device, and wherein each second mobile device is configured to determine from a second allocation map received via a second wireless interface one or more sections of downlink bandwidth allocated to multicast/broadcast services (MBS), one or more sections of downlink bandwidth allocated to the second mobile device and one or more sections of uplink bandwidth allocated to the second mobile device, decode data received via the second wireless interface during the sections of downlink bandwidth allocated to MBS, decode data received via the second wireless interface during the sections of downlink bandwidth allocated to the second mobile device and transmit data via the second wireless interface during the sections of uplink bandwidth allocated to the second mobile device, a third mobile device in a third device group, comprising:

a third wireless interface; and
 a processor communicatively coupled with the third wireless interface, wherein under control of the processor the third mobile device is configured to determine from the first allocation map received via the third wireless interface one or more sections of downlink bandwidth and one or more sections of uplink bandwidth allocated to the third mobile device, decode data received via the third wireless interface during the sections of downlink bandwidth allocated to the third mobile device, determine from the second allocation map received via the third wireless interface the sections of downlink bandwidth allocated to MBS, decode data received via the third wireless interface during the sections of downlink bandwidth allocated to MBS, and transmit data via the third wireless interface during the sections of uplink bandwidth allocated to the third mobile device, wherein the third mobile device is configured to first determine from the first allocation map received via the third wireless interface one or more sections of downlink bandwidth and one or more sections of uplink bandwidth allocated to the third mobile device, then decode data received via the third wireless interface during the sections of downlink bandwidth allocated to the third mobile device, then determine from the second allocation map received via the third wireless interface the sections of downlink bandwidth allocated to MBS, then decode data received via the third wireless interface during the sections of downlink bandwidth allocated to MBS, and finally transmit data via the third wireless interface during the sections of uplink bandwidth allocated to the third mobile device.

2. The third mobile device of claim 1, wherein under control of the processor the third mobile device is configured to switch the third wireless interface from a downlink frequency to an uplink frequency between the sections of downlink bandwidth allocated to MBS and the sections of uplink bandwidth allocated to the third mobile device.

3. The third mobile device of claim 2, wherein under control of the processor the third mobile device is configured to switch the third wireless network interface from the uplink frequency to the downlink frequency between the sections of uplink bandwidth allocated to the third mobile device and sections of downlink bandwidth having the first allocation map.

4. The third mobile device of claim 1, wherein the sections of downlink bandwidth allocated to MBS immediately follow the second allocation map on a downlink frequency.

5. The third mobile device of claim 1, wherein the data transmitted during the sections of uplink bandwidth allocated to the third mobile device include an indication that the third mobile device is subscribing to MBS.

6. The third mobile device of claim 1, wherein the data transmitted during the sections of uplink bandwidth allocated to the third mobile device include a request to join the second device group.

7. The third mobile device of claim 6, wherein the request is prompted by a determination on the mobile device that a need for uplink bandwidth exceeds a predetermined threshold.

8. A base station for a half frequency division duplex (H-FDD) communication system, comprising:
a base station wireless interface; and
a processor communicatively coupled with the base station wireless interface, wherein under control of the processor the base station is configured to assign mobile devices that communicate with the base station via the base station wireless interface to three device groups including a first device group having one or more first mobile devices each configured to determine from a first allocation map transmitted by the base station one or more sections of downlink bandwidth and one or more sections of uplink bandwidth allocated to the first mobile device, decode data transmitted by the base station during the sections of downlink bandwidth allocated to the first mobile device and transmit data to the base station during the sections of uplink bandwidth allocated to the first mobile device, a second device group having one or more second mobile devices each configured to determine from a second allocation map transmitted by the base station one or more sections of downlink bandwidth allocated to multicast/broadcast services (MBS), one or more sections of downlink bandwidth allocated to the second mobile device and one or more sections of uplink bandwidth allocated to the second mobile device, decode data transmitted by the base station during the sections of downlink bandwidth allocated to MBS, decode data transmitted by the base station during the sections of downlink bandwidth allocated to the second mobile device and transmit data to the base station during the sections of uplink bandwidth allocated to the second mobile device, and a third device group having one or more third mobile devices each configured to determine from the first allocation map transmitted by the base station one or more sections of downlink bandwidth and one or more sections of uplink bandwidth allocated to the third mobile device, decode data transmitted by the base station during the sections of downlink bandwidth allocated to the third mobile device, determine from the second allocation map transmitted by the base station the sections of downlink bandwidth allocated to MBS, decode data transmitted by the base station during the sections of downlink bandwidth allocated to MBS, and transmit data to the base station during the sections of uplink bandwidth allocated to the third mobile device, wherein under control of the processor the base station is configured to reassign one or more third mobile devices to the second device group based at least in part on a determination of insufficient uplink bandwidth for the third device group.

9. The base station of claim 8, wherein the data transmitted during the sections of uplink bandwidth allocated to the third mobile device include an indication that the third mobile device is subscribing to MBS.

10. A base station for a half-frequency division duplex (H-FDD) communication system, comprising:
a base station wireless interface; and
a processor communicatively coupled with the base station wireless interface, wherein under control of the processor the base station is configured to assign mobile devices that communicate with the base station via the base station wireless interface to three device groups including a first device group having one or more first mobile devices each configured to determine from a first allocation map transmitted by the base station one or more sections of downlink bandwidth and one or more sections of uplink bandwidth allocated to the first mobile device, decode data transmitted by the base station during the sections of downlink bandwidth allocated to the first mobile device and transmit data to the base station during the sections of uplink bandwidth allocated to the first mobile device, a second device group having one or more second mobile devices each configured to determine from a second allocation map transmitted by the base station one or more sections of downlink bandwidth allocated to multicast/broadcast services (MBS), one or more sections of downlink bandwidth allocated to the second mobile device and one or more sections of uplink bandwidth allocated to the second mobile device, decode data transmitted by the base station during the sections of downlink bandwidth allocated to MBS, decode data transmitted by the base station during the sections of downlink bandwidth allocated to the second mobile device and transmit data to the base station during the sections of uplink bandwidth allocated to the second mobile device, and a third device group having one or more third mobile devices each configured to determine from the first allocation map transmitted by the base station one or more sections of downlink bandwidth and one or more sections of uplink bandwidth allocated to the third mobile device, decode data transmitted by the base station during the sections of downlink bandwidth allocated to the third mobile device, determine from the second allocation map transmitted by the base station the sections of downlink bandwidth allocated to MBS, decode data transmitted by the base station during the sections of downlink bandwidth allocated to MBS, and transmit data to the base station during the sections of uplink bandwidth allocated to the third mobile device, wherein under control of the processor the base station is configured to decode data received from the first, second and third mobile devices during sections of uplink bandwidth allocated to the first, second and third mobile devices, respectively, wherein decoded data from one or more of the third mobile devices comprises a request for reassignment to the second device group.

* * * * *